United States Patent
Lee et al.

(10) Patent No.: US 6,866,935 B1
(45) Date of Patent: Mar. 15, 2005

(54) METHOD FOR FABRICATING COATED PARTICLES AND COATED PARTICLES BASED PRODUCTS

(76) Inventors: Simon Lee, 121 Westmount Dr., Apt. 90, Farmington, MO (US) 63640;
Manli Feng, 121 Westmount Dr., Apt. 90, Farmington, MO (US) 63640

( * ) Notice: Subject to any disclaimer, the term of this patent is extended or adjusted under 35 U.S.C. 154(b) by 0 days.

(21) Appl. No.: 10/329,075

(22) Filed: Dec. 24, 2002

(51) Int. Cl.[7] .................................................. B32B 5/10
(52) U.S. Cl. ......................... 428/403; 428/405; 428/407; 427/212; 427/214; 427/222; 427/322; 427/353.5; 427/386
(58) Field of Search ............................... 428/403, 405, 428/407; 427/212, 214, 222, 322, 353.5, 386

(56) References Cited

U.S. PATENT DOCUMENTS

| | | | |
|---|---|---|---|
| 4,880,870 A | | 11/1989 | Zimmermann et al. |
| 5,151,230 A | | 9/1992 | Damberg |
| 5,714,263 A | * | 2/1998 | Jakubisin et al. ........... 428/407 |
| 6,036,998 A | * | 3/2000 | Calvo et al. ................ 427/214 |
| 2001/0047051 A1 | | 11/2001 | Greenberg et al. |
| 2002/0119314 A1 | | 8/2002 | Coffey |

* cited by examiner

Primary Examiner—Leszek Kiliman

(57) ABSTRACT

A method of coloring or coating particles, such as small stones, recycled plastic fragments or recycles rubber fragments comprises mixing the particles with curable liquid resin coating in a mixture, wherein the weight of the coating is within the range of 0.2 percent to 20 percent of the weight of the particles, accelerating the curing when needed by heating, radiation, or additional chemicals to speed the cure, and continuing to agitate the mixture in the mixer until the coating is cured. Preferably, the coated particles are recycled rubber fragments, and the particle size is larger than 0.1 mm, preferably in the range of 0.5 mm to 10 mm. The colored particles can be used as a cheap substitute colored EPTM granules.

8 Claims, 3 Drawing Sheets

An example of "two layer tile" based surfacing

Note:
1. Dotted lines represent the seams between bottom layer tiles.
2. The bottom layer tiles can have various designed legs or have no legs Fig. 1 An example of "two layer tile" based surfacing Note:
1. Dotted lines represent the seams between bottom layer tiles.
2. The bottom layer tiles can have various designed legs or have no legs

METHOD FOR FABRICATING COATED PARTICLES AND COATED PARTICLES BASED PRODUCTS

CROSS REFERENCE TO RELATED APPLICATIONS

STATEMENT REGARDING FEDERALLY SPONSORED RESEARCH OR DEVELOPMENT

Not Applicable

BACKGROUND OF THE INVENTION

This invention relates to method for coating or coating and coloring organic or inorganic particles and application designs of the coated particles. The method is not sensitive to the nature of the particles to be coated, and therefore could be widely used for various kinds of particles, such as stone gravel, rubber fragments and plastic fragments. The invention also relates to the production of articles using colored or coated particles, for example, as binderless molding material, as substitutes for colored EPDM granules and as substitutes for gravel.

Many materials in the form of particles or fragments are widely used in current industries and in some cases, such as the case of recycled tire granules, a color that is different from and more attractive than the original color of the particles/fragments is required by marketing. Besides, the coating on the particles, whether the coating contain colorant or not, will change the physical and chemical properties (such as melting or softening temperature) of the surface of the particles/fragments.

There is a technical contradiction in coloring or coating inorganic or polymeric particles. It is clear that any relatively static contact between coated particles during the period between the time they are freshly coated and the time that the coating loses its fluidity and becomes tacky-free will result in the coated particles' sticking together and forming chunks after the coating is cured. Therefore, if the relatively static contact between coated particles can not be completely avoided, the coating should be thin enough to avoid forming strong chunks of coated particles after the coating is cured, otherwise the strong chunks can not be broken without coating damage. On the other hand, a relative thick coating is needed in some cases. For instance, when coloring dark particles (such as tire fragments) for getting a light or bright color, the coating on inorganic or polymeric particles should be thick enough to hide the dark original color of the particles and show a required bright color.

The current commercial coating or coloring processes, which are represented by those described in U.S. Pat. Nos. 6,036,998 and 5,714,263, usually have two common points: (1) They need separate curing or drying equipment such as a heating tunnel to cure the coating after finishing mixing process in a mixer; (2) The freshly coated particles have a chance to stick to each other on a conveyer that carries them through the heat curing equipment. Even if using a vibrating conveyer, the freshly coated particles still risk sticking to each other when the particle size is fine (such as 0.5–3 mm). A separate curing step and the required heating unit increase equipment investment, processing time, energy and labor cost. The relatively static contact between coated particles during the curing period will cause particle chunks to be formed after cure. In order to avoid forming strong chunks that can not be broken without coating damage, the color coating has to be made thin enough not to bind strongly, and, therefore, in many cases, a satisfactory color shade cannot be obtained.

Recycled polymer fragments are currently widely used to make molded products, such as rubbery tiles and sheets. However, due to the thermosetting character of many recycled polymer particles (such as tire fragments or thermosetting plastic fragments), the manufacturers of these molded products have to use a liquid resin system as binder to hold the particles and form a final product with designed shape. The using of binder complicates the required processing equipment that must include two mixing units—one for mixing a formulated binder system and another one for mixing binder and particles. Additionally, the liquid binders are usually toxic chemicals (such as urethane prepolymers). Furthermore, the mixing units have to be cleaned every time after use and that costs much labor expense.

BRIEF SUMMARY OF THE INVENTION

In accordance with the present invention, a method to coat or to coat and color organic or inorganic particles and application designs of coated or color coated particles are disclosed. The coating or coloring method and application designs are both efficient and cost effective.

A coating or coloring method disclosed in this invention is described as conducted with a batch mixer or a continuous mixer that can be a simple structure or can have a heating, radiation, or chemical feeding part, depending upon the selection of the kind of coating. An example of this process includes the following steps: Introducing particles into a mixer; mixing the particles with curable liquid resin coating, which may be colored or pigmented, that can cure fast under certain conditions; if necessary, accelerating the curing reaction of the coating by heating, radiation or the addition of chemicals that can make the selected reactive coating cure fast; and continuing to run the mixer until the coating on the particles is cured. The curable liquid polymer coating can be a system of epoxy resin, urethane and/or urea resin, unsaturated polyester resin, acrylic resin or other resins, and can contain colorant, photoinitiator, catalyst, curing agent, UV stabilizer and other desired additives. Any mixing device can be used, as long as the particles are kept in motion with respect to one another during the coating and curing process.

By properly designing the coating formulation, a flexible thermoplastic coating with proper softening/melting point can be formed on the particles by the above coating method. If the thermoplastic coating is thick enough, and the particles are flexible, the coated particles can be used as a binderless molding material, to make molded parts that have enough strength for many applications.

Colored EPDM granules (a virgin synthesized elastomer) of 0.5–4.0 mm are currently widely used to make various surfacings, such as the top surface of tiles and wearing courses of "pour on site" products, to cover playing/sport/recreation/residence areas. Besides, colored EPDM granules can be also used in some other applications. The colored recycled rubber granules made by the method disclosed in this invention can be used as a cheap substitute for EPDM granules in every above application.

A special design of colored recycled rubber fragments-based surfacing system is disclosed. This is tile based surfacing consisting of two layers. The top layer is a layer of compact flat tiles made from colored recycled rubber fragments made by the method of this invention and has a thickness of 6–25 mm, preferably 13 mm. The bottom layer is a layer of the tiles that have lower bulk density than traditional tiles and made from raw recycled rubber shred or granules. The thickness of the bottom layer is dependent on the critical falling height required. When installing the surfacing, the colored top layer is adhered to the bottom tile layer in a staggered way to cover seams of the bottom layer. Compared with traditional single layer tile surfacing, this "double layer" tile surfacing has merits of low cost, improved resolution of the "seam problem" and higher impact attenuation.

Pea gravel and stone fragments are currently used in plant bonsai, fish jar or pond, and some other applications where nice color would be preferable. The gravel or stone fragments in these applications can be replaced with colored gravel or colored recycled polymer fragments to take advantage of their greater color choices and brighter color shades. If colored fragments of recycled plastics or rubber are used, the merits of low density and low volume based cost will also be had.

DETAILED DESCRIPTION OF THE INVENTION

Figure 1:
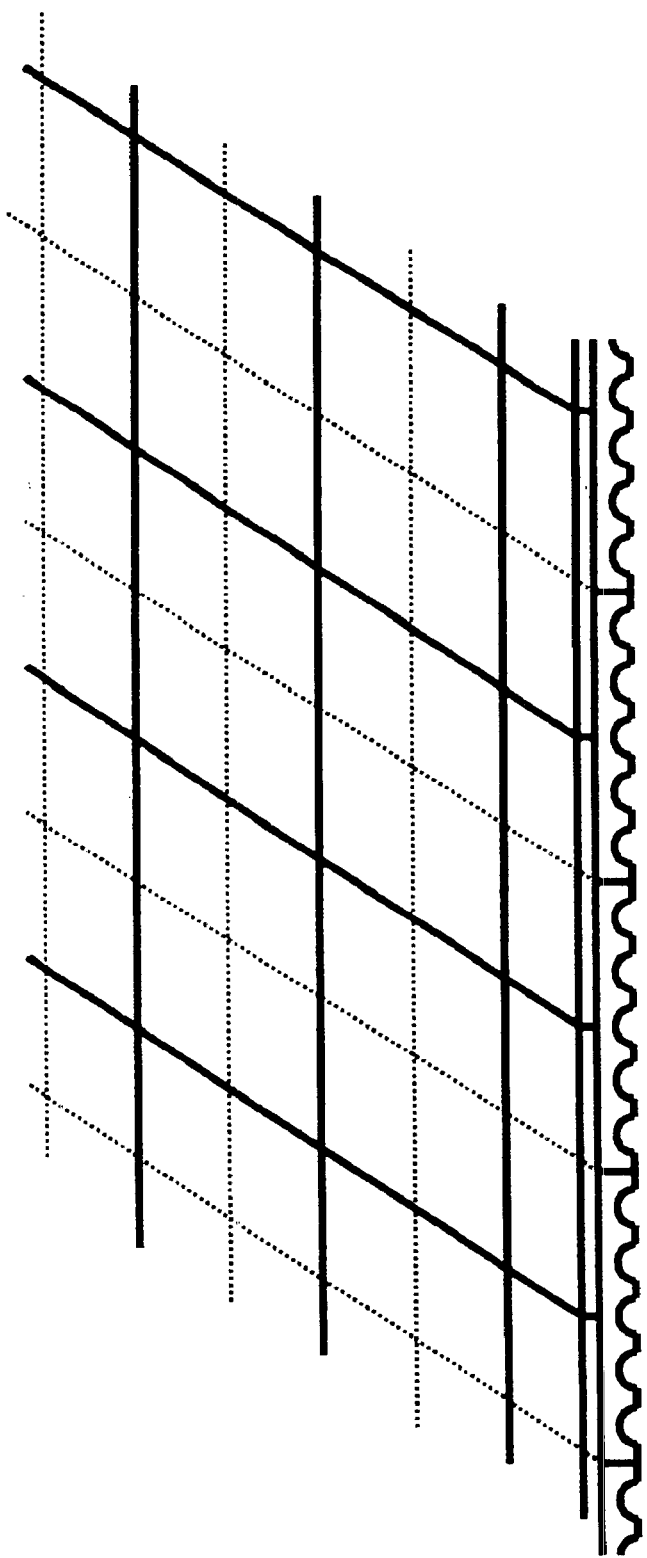
FIG. 1 illustrates a double layer tile surfacing of this invention.

A method to coat or color particles disclosed herein will allow providing a thin or thick coating on particles without risk of forming chunks after cure and without need of a separate heating curing equipment to cure the coating on particles. Also, elimination of the "chunk problem" will widen the particle size range of fragments that are suitable to be colored or coated because usually the smaller the particle size, the more difficult to avoid forming particle chunks or completely breaking the formed chunks. Furthermore, its short processing course and simple equipment requirement will bring economic benefit to manufacturers. Besides, the method disclosed in this invention results in new applications of recycled polymer materials and so that can bring environmental benefit to communities.

The term "particles" as used in this specification encompasses various regular or irregular shapes, organic or inorganic materials, and a wide range of particle size. The more important particles include fragments (such as powders, granules and shreds) of recycled plastics, fragments (such as powders, granules and buffings) of recycled rubber, and small stones. The usual range of particle size is from 0.1 mm to 75 mm, preferably 0.5–4 mm for polymer particles and 3–30 mm for small stone.

The method to coat or coat and color particles described below can be conducted with various kinds of mixers, including batch vertical mixers (such as paddle mixers), batch horizontal mixers (such as ribbon mixers), batch rolling mixers (such as cement mixers) and various continuous mixers. The mixer is a simple structured mixer when the selected coating can cure fast at room temperature. When the selected coating can not cure at room temperature enough fast, an additional part of the mixer will be needed, such as a heating part, a UV radiation part, or a feeding part to add in the chemicals that can make coating cures fast. The process and formulations of this method are described as below.

The process steps include: charging particles to color or coat in a mixer; starting the mixer, adding in 0.5–20% (based on particles weight) curable liquid resin system as coating, and mixing well; if need, accelerating curing reaction of the coating by heating, radiation, or adding in additional chemicals (such as catalyst, accelerator, fast cure agent or any combination thereof); continuing to run the mixer until the coated particles becomes tack-free; discharge coated particles into final product container.

The curable resin can be one of many curable resin systems, such as an epoxy system, urethane/urea system, unsaturated polyester, acrylics, etc. The resin system can be 100% solid or solvent based. The resin system can contain colorant, catalyst, photoinitiator, curing agent, UV stabilizer and other desired additives.

The curable resin coating can be a coating that can fast cure at room temperature. This kind of coating can be an epoxy system (such as epoxy resin+aliphatic amine), urethane system (such as polyol containing catalyst+aromatic polyisocyanate), or urea system (such as polyamine+polyisocyanate), which contains high reactive curing agent and/or catalyst and so can fast cure at room temperature. This kind of coating can also be an unsaturated polyester system that contains redox initiator and can fast cure at room temperature. When using this kind of coating, a simple structured common mixer without heating part will be used. If the curing speed of the selected coating is too fast (such as pot life<5 min), a plural component spray equipment can be used for adding in coating in order to avoid "pot life" problem. After the coating and particles are mixed well, if necessary or to further shorten process time, some additional chemicals, such as strong catalyst, accelerator or a chemical that can make the coating cure very fast can be added in the mixer. In this case, a feeding part to add in the additional chemicals may be needed. This kind of coating will cure in a short time (such as<30 min) under agitating/mixing/stirring at ambient temperature.

The curable resin coating can be a coating that can fast cure at a relatively high temperature. This kind of coating includes an epoxy system that contains aromatic polyamine, polyamide, ketimine, oxazolidine, or dicyandiamide as curing agent; and a urethane/urea system that consists of blocked prepolymer and amines, or prepolymer and blocked amines (ketimines, etc.), or polyol, delayed action catalyst, and polyisocyanate. When using this kind of coating, a mixer with heating part will be used. The heating part can be a hot air blower or a heating jacket, preferably the former because its high efficiency. After coating and particles are mixed well, the material will be heated to the temperature that fast curing reaction of coating needs and the coating will be cured in a short time. The raw materials can be preheated to a safe temperature at which the coating will have enough time before curing to mix well with the particles, in order to shorten the coating process. The raw material to preheat can be the coating, the particles to coat, or both.

The curable resin coating can be a radiation curable acrylic, epoxy, or unsaturated polyester coating that contains photoinitiator. When using this kind of coating, a mixer with a radiation part will be used. After the coating and particles are mixed well, the radiation source (such as UV lamp) will be turned on and this kind of coating will be cured in a short time.

As said above, because the coated particles always keep moving with respect to each other until cured, the processes of this coloring or coating method has no risk of a "chunk problem" and therefore is good to coat fine particles, make relatively thick coating and high quality color shades.

The invention also relates to the use of the coated or colored particles as a binderless molding material, a substitute for colored EPDM granules, and a substitute for gravel.

An application design of coated or colored particles, using coated particles as binderless molding material is disclosed as below.

When the particles to be coated are flexible or elastic particles, such as recycled rubber granules or buffing, and the coating is thermoplastic, flexible and thick enough, the produced coated particles can be used as a "ready to mold material" or "binderless molding material". In other words, the coated flexible fragments that have enough thick and thermoplastic coating can be directly molded/extruded into various parts with designed shapes by molding machine or extruder at a proper temperature and under a proper pressure, without the assistance of binder or any other chemicals. The temperature for molding/extruding process should be around or over the melting/softening point of the coating that encapsulates the flexible fragments. The molded or extruded products can have enough good strength for many applications, and can be tile, mat, sheet, belt, or parts with other designed shapes. This kind of coated particles, which can be used as binderless molding material, can be made by the above disclosed coloring or coating method, or other coating methods. The coating to make this kind of coated particles can contain colorant or no colorant.

With the coloring or coating method of this invention, a coating that is flexible, thermoplastic, and thick enough for using as binderless molding material can be formed on the external surface of the particles, provided the coating formulation is designed to have flexible character and have no substantial crosslinking structure. In order to avoid crosslinking structure, the functionality of resin and curing agent in a selected reactive coating formulation should not be more than two.

When using colored particles, which are coated with colored coating, as "binderless molding material", the molded parts will have same nice color as the colored particles, because a proper molding process will not damage the color coating of the colored particles.

Obviously, compared with the current molding material of "polymer particles+binder", using coated flexible polymer particles as a "ready to mold material" has a series of benefits, including low equipment investment, no need to deal with toxic chemical binder, no hard clean-up job and low processing cost, as well as making molded parts a desired color without any additional work during or after molding process if colored particles are used. Besides, this new application of coated recycled polymer fragments can increase the recycled amount of waste polymer materials and thus bring environmental benefit.

A special designed rubber tile based surfacing system is disclosed as below. This tile based surfacing has colored rubber crumb as one of its main raw materials and the colored rubber crumb can be made by the above coloring method.

Different from traditional single layer tile surfacing, this tile based surfacing consists of two layers (see FIG. 1). A top layer is a layer of flat tiles made from colored recycled rubber fragments, about 6–25 mm thick, preferably about 13 mm thick. A bottom layer is a layer of the tiles that have substantially lower bulk density than the top layer tiles and traditional single layer tiles, made from raw recycled rubber fragments (shred or granules). The thickness of the bottom layer depends on the critical falling height required. When installing the surfacing system, the top layer (wearing course) tiles should be adhered to the bottom layer (shock pad) tiles in a staggered way to cover seams of the bottom layer. Compared with traditional single layer tile based surfacing, this two-layer tile based surfacing has three merits. Number one is low cost, because the bottom layer that usually takes about 80% of the total thickness for a typical playground, has lower density and therefore needs less raw materials than traditional tiles. Number two is that the "seam problem" is greatly reduced. The said "seam problem" is a tendency to deform on the seams after a period of use. The exposed seams on the two-layer tile based surfacing is only about 13 mm deep usually, much less than the seams on traditional single-layer tile based surfacing that is usually more than 50 mm thick for a play area. Therefore, the two-layer surfacing has a much less deforming tendency on seams than the traditional single-layer surfacing. Number three is that the two-layer tile based surfacing has higher impact attenuation than single-layer tile based surfacing at the same total thickness because its shock pad is looser and softer than the latter. In other words, the two-layer tile base surfacing of this invention will offer higher impact attenuation with lower cost than traditional rubber tile based surfacing.

Besides making surfacing, colored inorganic or polymeric particles (such as fragments of stone, plastics or rubber) can be used for more new applications.

Small stones, such as pea gravel and stone fragments, are widely used in plant bonsai, fish jar or pond, and some other applications where nice color would be preferable. These gravel or stone fragments can be replaced with colored gravel, colored plastics fragments or colored rubber fragments made by the above coloring method. These colored particles have much nicer colors and much more color choices than original small stones do. Furthermore, if the colored particles to replace gravel or stone fragments are colored fragments of recycled polymer (plastics or rubber) fragments, they will have two more merits: low specific gravity and low volume based cost.

EXAMPLE 1

Charge 3300 g pea gravel (1–6 mm) in a paddle mixer of 1 gal and start the mixer. Mix 28.52 g EPON RESIN 828 g (Resolution Performance Products) and 5.0 g green chromium oxide in a plastic cup well, add in 21.48 g EPIKURE Curing Agent 3270 (Resolution Performance Products) and mix well in 1 min, then transfer the mixed green coating into the paddle mixer. Run the mixer until the coated gravel become tacky-free. Discharge the final product.

EXAMPLE 2

Charge 1200 g PU RIM bumper fragments (1–6 mm) in a ribbon mixer of 1 gal and start the mixer. Mix 57 g Polylite 32358 (Reichhold) and 5.0 g red iron oxide well in a plastic cup, add 0.6 g Superox 46709 (Reichold) in the cup and mix well in 1 min, then transfer the mixed red coating into the mixer. Continue to run the mixer until the coated fragments become tacky-free. Discharge the final product.

EXAMPLE 3

Charge 1200 g recycled PU RIM bumper fragments (1–6 mm) in a ribbon mixer of 1 gal and start the mixer. Add 49.5 g red premixed coating that contains 20.89 g Voranol 222-029 (Dow Chemical), 20.89 g Voranol 232-034 (Dow Chemical), 2.67 g 1,4 butanediol (Air Product), 0.31 g Dabco T1 (Air Products) and 5.0 g red iron oxide, then 17.0 g Isonate 2181 (Dow Chemical) into the paddle mixer. Continue to run the mixer until the coated granules become tacky-free. Discharge the final product.

EXAMPLE 4

Preheat 1200 g recycled tire granules (1–4 mm) to 70° C. and charge in a paddle mixer of 1 gal. Start the mixer.

Charge in the mixer 132 g premixed colored epoxy coating that contains 50.8 g EPON RESIN 828, 69.2 g Curing Agent DPC-3164 (Shell Chemical), and 12 g red color paste. The red color paste contains red iron oxide and Voranol 220-028 (Dow Chemical) at mixing ratio of 50/50. Blow hot air to the mixture, as by a hair dryer, to further accelerate curing reaction of the coating and continue to run the mixer until coating on granules is tacky free. Discharge the final product.

EXAMPLE 5

Take 1200 g recycled tire granules (0.5–1 mm) that contain 0.5% or more water and charge in a 1 gal ribbon mixer. Start the mixer. Charge in 132 g premixed colored urethane coating that contains 105 g Rubinate 9043 (ICI Polyurethane), 14 g EPI-CURE Curing Agent 3502 (Resolution Performance Products), and 13 g blue color paste. The color paste contains $TiO_2$, Irgalite Blue GLNF (CIBA Specialty Chemicals) and Voranol 220-028 (Dow Chemical) at mixing ratio of 25/25/50. Blow hot air to the mixture by a hair dryer to accelerate curing reaction of the coating and continue to run the mixer until coating on granules is tacky free. Discharge the final product.

EXAMPLE 6

Take 1200 g tire granules (1–2 mm) and charge in a ribbon mixer of 1 gal that has two holes in its cover for transfer in and venting out EDA (ethylene diamine) vapor when needed. Take 120 g premixed colored urethane prepolymer coating that contains 90% Vibrathane RB871 (UniRoyal Chemical) and 10% green color paste. The green color paste contains green chromium oxide, $TiO_2$ and Voranol 220-028 (Dow Chemical) at mixing ratio of 25/25/50. Start the mixer and mix the bumper fragments and coating well. Transfer EDA vapor from a boiler into the mixer. The boiler generates EDA vapor and is connected onto a hole in the cover of the mixer by a tube. Continue to run the mixer until coating is tacky free. Cool down the EDA boiler and close the tube to transfer in EDA vapor. Vent out excessive EDA vapor by an air exhauster or pump. The exhauster is connected onto another hole on the cover of the mixer by another tube. A condenser could be set up between the mixer and the exhauster to liquid the excessive EDA vapor for recycle. Discharge the final product.

EXAMPLE 7

Take 60 kg recycled polycarbonate fragments (1–6 mm) made from waste car dashboard and charge in a ribbon mixer of 200 L with UV lamps under the cover plate. Take 1000 g premixed colored UV curable coating and add in the mixer. The colored UV curable coating contains 10.2% Cyracure Resin UVR-6110 (Union Carbide), 15.6% Cyracure Resin UVR-6128 (Union Carbide), 4% Cyracure photoinitiator UVI-6974 (Union Carbide), 10.6% Terathane 650 (Du Pont), 0.8% Isopropylthioxanthone (Aceto Corp), 0.8% BYK P-104S (BYK-Chemie), 0.8% Silwet L-7604 Silicone Surfactant (Witco), 4.3% n-Propanol and 52.9% $TiO_2$. The above percentage data are based on total weight of the coating formulation. Run the mixer until plastic fragments and colored coating are mixed well. Turn on UV lamps and continue to run the mixer until coated granules are tacky free.
Discharge the final product.

EXAMPLE 8

Add 1200 g tire granules (0.5–1.0 mm) and 120 g NeoCryl A1052 (NeoResins) in a paddle mixer of 1 gal. Start the mixer and blow hot air to the mixture by a hair dryer to accelerate coating drying. (Hot air flow has higher drying efficiency than heating jacket.) Continue to run the mixer and blow hot air until coated granules tacky-free. Discharge the coated tire granules.

Figure 2:
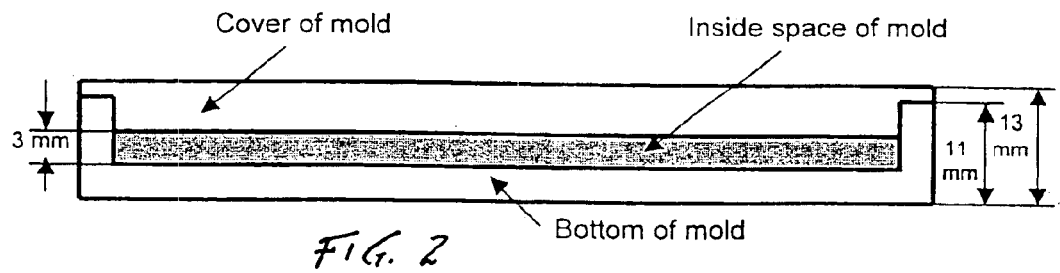
FIG. 2 is a sectional view of a mold used to produce a tile with coated fire particles as binderless molding material in Example 8 and 9.
Figure 3:
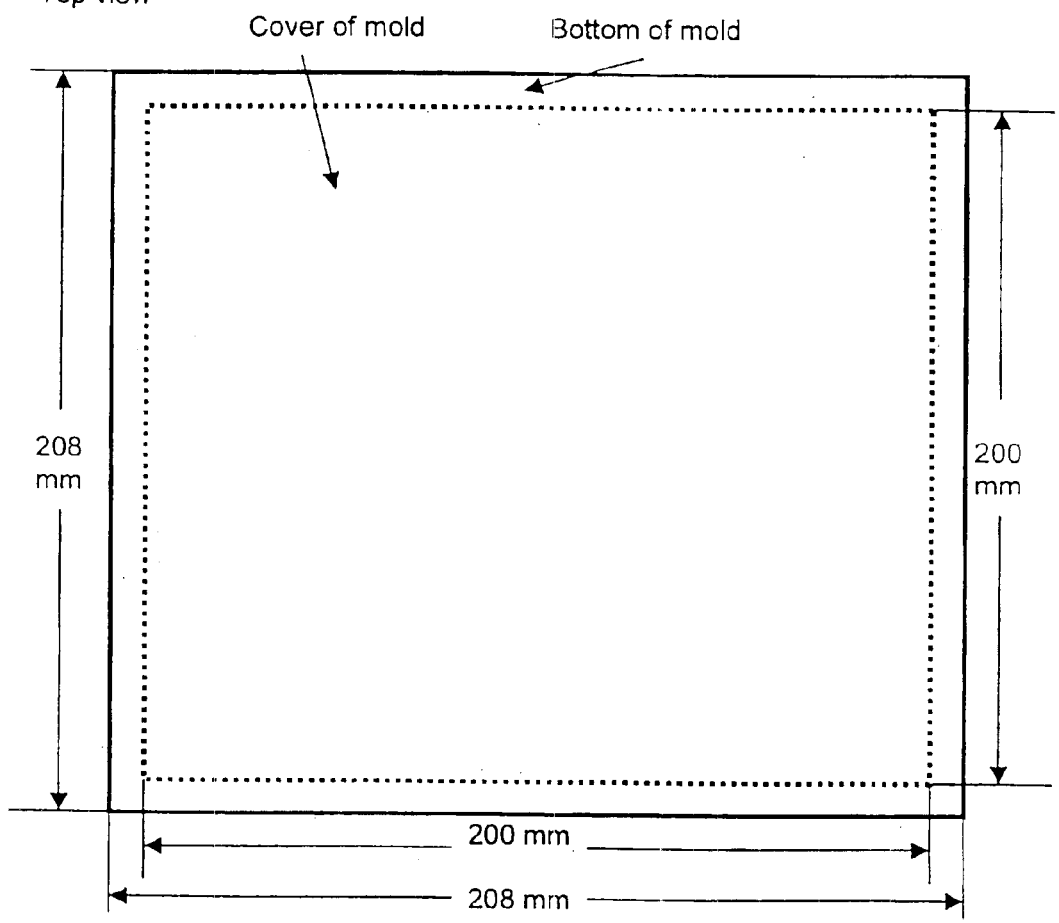
FIG. 3 is a top plan view of the mold of FIG. 2.
Figure 4:
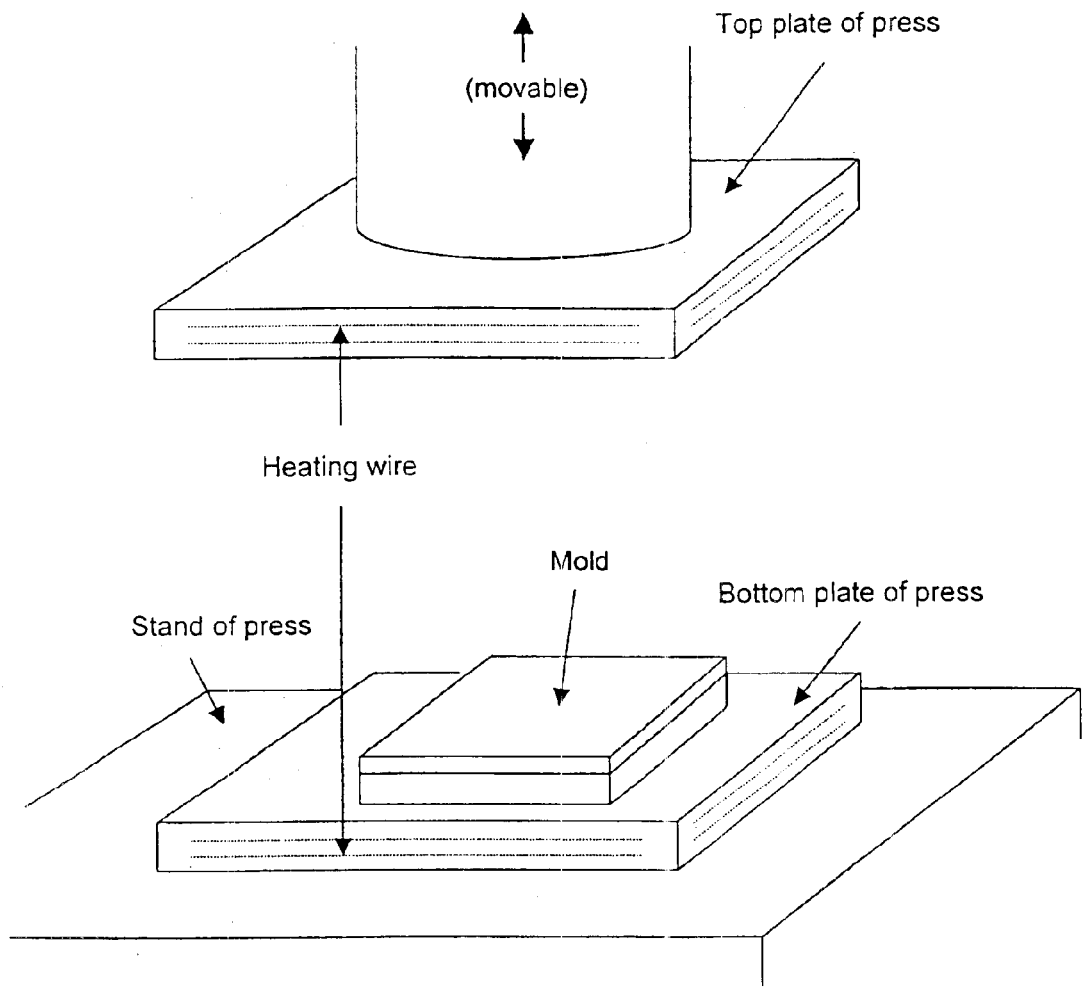
FIG. 4 is an exploded view of a press used in conjunction with the mold of FIGS. 2 and 3.

Make a steel mold as shown as FIGS. 2 and 3. Get a heating press that has heating wire inside its top and bottom plates as shown as FIG. 4. Preheat the plates of the heating press to 140° C. Put 120–130 g produced coated tire granules in the bottom part of mold, put on the cover part of mold, then move the mold onto the bottom plate of the heating press. Lower the top plate of the press and compress the mold to fully dose it so that the inside space of mold is compressed down to 3 mm deep. Hold the mold and pressure for 2–10 min. Raise the top plate of press, move out the mold and take off the molded rubber sheet that is a non-porous flexible sheet with good strength for many applications (tensile strength>200 psi., Elongation %>40%).

EXAMPLE 9

Take 120–130 g colored rubber granules made in Example 5 or 6 to replace the coated tire granules as "binderless molding material" to do a same molding as that conducted in Example 8, but raise the temperature of plates of the heating press to 180° C.

Numerous variations in the composition and methods of this invention within the scope of the appended claims will occur to those skilled in the art in light of the foregoing description.

What is claimed is:

1. A rubber tile based surface of double layer structure for covering playing, recreation, sport or resident area, wherein the tiles of top layer are made from colored rubber fragments, have higher bulk density than the tiles of bottom layer do, and are adhered on the tiles of bottom layer in a staggered way to cover the seams between the tiles of bottom layer, resulting from the process, comprising:

providing colored and non-colored rubber fragments;
providing a curable binder;
providing a mixer;
mixing the colored rubber fragments with the curable binder and molding the mixture to form colored rubber tiles with thickness of 6–25 mm;
mixing the non-colored rubber fragments with the curable binder and molding the mixture to form non-colored rubber tiles that have lower density than the colored rubber tiles do;
putting the non-colored rubber tiles on substrate of playing, recreation, sport or resident area to form the bottom layer of a double layer structured rubber surfacing;
adhering the colored rubber tiles on the bottom layer tiles in a staggered way to cover seams between the bottom layer tiles to form the top layer of the double layer structured rubber surfacing.

2. The rubber tile based surface of claim 1, wherein the non-colored rubber fragments to make bottom layer tiles are recycled rubber fragments, including granules and buffings.

3. The rubber tile based surface of claim 1, wherein the colored rubber fragments to make top layer tiles result from the process, comprising:
providing recycled rubber fragments;
providing a cold curable colored coating that can be cured fast in 30 minutes during mixing with recycled rubber fragments in a mixer at ambient temperature;

providing a mixer;

mixing the rubber fragments with the cold curable colored coating in the mixer until coating is cured;

discharge the cured color coated rubber fragments for storage.

4. Coated fragments based binderless molded/extruded flexible parts, wherein the fragments to be coated are flexible or elastic polymer fragments, the coating to coat the polymer fragments is flexible and thermoplastic after cure, and the molded/extruded parts are formed by providing proper temperature and pressure but no binder during molding/extruding process, resulting from the process, comprising:

providing flexible polymer fragments;

providing a flexible thermoplastic coating;

providing a mixing equipment;

providing a molding equipment or extruder;

mixing the flexible fragments with the thermoplastic coating in the mixing equipment and making the coating cured for storage;

taking proper amount of the coated fragments from storage and transferring into the molding equipment or extruder;

providing proper pressure and temperature in the mold or extruder, wherein the temperature is around or over the melting or softening point of the thermoplastic coating encapsulating the fragments, to make the fragments stick together by their melted or tacky coating during molding or extruding process and forming a part with designed shape after de-mold or extruding without assistance of binder.

5. The binderless molded/extruded parts of claim 4, wherein the flexible polymer fragments to be coated are recycled rubber fragments, including granules and buffings; the coating to coat the recycled rubber fragments is a cold curable colored coating that can be cured fast in 30 minutes during mixing with the recycled rubber fragments in a mixer at ambient temperature; and the coated polymer fragments result from the process, comprising:

providing recycled rubber fragments;

providing a colored or non-colored cold curable coating that can be cured fast in 30 minutes during mixing with the recycled rubber fragments in a mixer at ambient temperature, and wherein the functionalities of reactants of the coating is two or one, therefore, no substantial crosslinking structure can be formed in the coating, providing a mixer;

mixing the rubber fragments with the cold curable colored coating in the mixer until coating is cured;

discharge the cured coated rubber fragments for storage.

6. Colored granules to replace gravel or small stones used in the applications where gravel is applied and different colors or both different colors and low density are desired, resulting from the process, comprising:

providing granules;

providing a cold curable colored coating that can be cured fast in 30 minutes during mixing with the granules to coat in a mixer at ambient temperature;

providing a mixer;

mixing the granules with the cold curable colored coating in a mixer until coating is cured and then discharge.

7. The colored granules of claim 6, wherein the granules are gravel or small stones with article size of 3–30 mm and the colored granules are used to replace small stones in the applications where the small stones are applied and different colors are desired.

8. The colored granules of claim 6, wherein the granules are recycled polymer granules with article size of 3–30 mm and the colored granules are used to replace small stones in the applications where the small stones are applied and both different colors and reducing specific gravity are desired.

* * * * *